US006771758B1

(12) United States Patent
Sandel et al.

(10) Patent No.: US 6,771,758 B1
(45) Date of Patent: *Aug. 3, 2004

(54) RECONCILING DATABASE INFORMATION AMONG SERVICE PROVIDERS

(75) Inventors: David R. Sandel, Colorado Springs, CO (US); Alexander G. Narinsky, Newton, MA (US)

(73) Assignee: WorldCom, Inc., Jackson, MS (US)

( * ) Notice: Subject to any disclaimer, the term of this patent is extended or adjusted under 35 U.S.C. 154(b) by 348 days.

This patent is subject to a terminal disclaimer.

(21) Appl. No.: 09/917,073

(22) Filed: Jul. 27, 2001

Related U.S. Application Data

(63) Continuation-in-part of application No. 09/776,785, filed on Feb. 5, 2001, now Pat. No. 6,665,391.

(51) Int. Cl.[7] .............................. H04M 3/42; H04M 7/00
(52) U.S. Cl. .............................. 379/201.12; 379/201.05; 379/219
(58) Field of Search ....................... 379/201.02, 201.03, 379/201.05, 201.12, 219, 220.01, 229

(56) References Cited

U.S. PATENT DOCUMENTS

| 5,416,833 | A | | 5/1995 | Harper et al. ........... 379/201.05 |
|---|---|---|---|---|
| 5,491,742 | A | | 2/1996 | Harper et al. ........... 379/201.12 |
| 5,644,619 | A | | 7/1997 | Farris et al. ............. 379/29.01 |
| 5,881,131 | A | | 3/1999 | Farris et al. ............. 379/15.03 |
| 5,937,048 | A | | 8/1999 | Pelle ..................... 379/201.12 |
| 6,104,798 | A | | 8/2000 | Lickiss et al. .......... 379/201.12 |
| 6,304,647 | B1 | * | 10/2001 | Frost ..................... 379/201.12 |
| 6,499,017 | B1 | * | 12/2002 | Feibelman et al. ............ 705/8 |
| 6,546,095 | B1 | * | 4/2003 | Iverson et al. .......... 379/201.12 |
| 2002/0106067 | A1 | * | 8/2002 | Sandel et al. .......... 379/201.03 |

* cited by examiner

Primary Examiner—Harry S. Hong

(57) ABSTRACT

Disclosed is a system that prevalidates service orders placed by an interexchange carrier with a local exchange carrier for connection of the interexchange carrier with a business customer. An integrated prevalidation system and service order system is disclosed in which prevalidation requests are performed to ensure that a service order will be correct when submitted, thereby avoiding the necessity for expensive supplemental orders. The present invention further provides for generating accurate service orders based upon information separately maintained by the interexchange carrier regarding the local carrier's facilities and using prevalidation requests to reconcile the separately maintained information with the database of the local exchange carrier.

12 Claims, 14 Drawing Sheets

Rapid Access Validation Engine

CFA Inquiry | Location Inquiry | Service Inquiry

LEC: SBC ▼ — 110

CFA Inquiry Input — 112

Fac Desg: [ ]  Fac Type: [ ]
Loc A: [ ]  Loc Z: [ ]  Channel: [ ]  Clear

PrePopulate Option — 114

Netpro Circuit: [ ]  Netpro Order: [ ]

| Circuit | Location | Leg | CFA |
|---|---|---|---|

Select All

Output Choices — 118

| Status | LecID | Date | ID | CFA |
|---|---|---|---|---|
| Gateway Sent | Sbc | 10/27/1999 @ 09:59 AM | 10739 | 9504/T1/LTRKARFRHA2/LTRKARFRK06/ |
| Reply Seen | Sbc | 10/27/1999 @ 09:58 AM | 10732 | 9504/T1/LTRKARFRHA2/LTRKARFRK06/2 |
| Reply Seen | Sbc | 10/15/1999 @ 10:42 AM | 10727 | 9504/T1/LTRKARFRHA2/LTRKARFRK06/ |
| Reply Seen | Sbc | 10/15/1999 @ 10:42 AM | 10726 | 9504/T1/LTRKARFRHA2/LTRKARFRK06/ |
| Reply Seen | Sbc | 10/15/1999 @ 10:42 AM | 10725 | 9504/T1/LTRKARFRHA2/LTRKARFRK06/ |
| Reply Seen | Sbc | 10/15/1999 @ 10:42 AM | 10724 | 9504/T1/LTRKARFRHA2/LTRKARFRK06/ |
| Reply Seen | Sbc | 10/15/1999 @ 10:42 AM | 10723 | 9504/T1/LTRKARFRHA2/LTRKARFRK06/ |
| Reply Seen | Sbc | 10/15/1999 @ 10:42 AM | 10722 | 9504/T1/LTRKARFRHA2/LTRKARFRK06/ |

116 — Send  Edit

| Status | LecId | Date | ID | Data Sent |
|---|---|---|---|---|
| Reply Seen | Pac | 10/15/1999 @ 08:50 AM | 10464 | DLLSTXBAWMG |
| Reply Seen | Sbc | 10/15/1999 @ 08:49 AM | 10463 | ST LOUIS UNION STATION, MO 63103 |
| Reply Complete | Sbc | 10/14/1999 @ 02:51 PM | 10428 | ST LOUIS UNION STATION, MO 63103 |
| Reply Complete | Pac | 10/14/1999 @ 02:51 PM | 10427 | DLLSTXBAWMG |
| Reply Seen | Pac | 10/08/1999 @ 09:24 AM | 10351 | DLLSTXBAWMG |
| Reply Seen | Pac | 10/07/1999 @ 04:59 PM | 10349 | DLLSTXBAWMG |
| Reply Seen | Sbc | 10/07/1999 @ 04:58 PM | 10348 | ST LOUIS UNION STATION, MO 63103 |
| Reply Seen | Sbc | 10/07/1999 @ 04:57 PM | 10345 | ST LOUIS UNION STATION, MO 63103 |
| Error | Sbc | 10/07/1999 @ 03:24 PM | 10341 | ST LOUIS UNION STATION, MO 63103 |
| Error | Sbc | 10/07/1999 @ 03:23 PM | 10338 | ST LOUIS UNION STATION, MO 63103 |
| Reply Seen | Pac | 10/07/1999 @ 03:23 PM | 10337 | DLLSTXBAWMG |
| Reply Complete | Pac | 08/31/1999 @ 04:19 PM | 10317 | DLLSTXBAWMG |
| Reply Complete | Pac | 08/31/1999 @ 04:01 PM | 10316 | DLLSTXBAWMG |
| Reply Complete | Sbc | 08/31/1999 @ 04:01 PM | 10315 | ST LOUIS UNION STATION, MO 63103 |
| Reply Seen | Sbc | 08/31/1999 @ 04:00 PM | 10314 | ST LOUIS UNION STATION, MO 63103 |

FIG. 7

Rapid Access Validation Engine

CFA Inquiry | Location Inquiry | ST LOUIS UNION STATION, MO 63103 | Service Inquiry ID: 10740          IRI: Alternatives Exist          LEC: Sbc LIT: Numbered Customer Premise Address Input
Address: ST LOUIS UNION STATION MO 63103

Customer Premise Address Output — 144

| Street/Name | Floor | Room | Bldg | City | State | Postal Code | LSO | SWC |
|---|---|---|---|---|---|---|---|---|
| 1820 MARKET | 2ND | UNIT 215 | | ST LOUIS | MO | 63103 | 314241 | |
| 1820 MARKET | | UNIT 100 | | ST LOUIS | MO | 63103 | | |

IRM
ST LOUIS UNION STATION

FIG. 8

| | Rapid Access Validation Engine | | | | | _ □ × |
|---|---|---|---|---|---|---|
| CFA Inquiry | Location Inquiry | ST LOUIS UNION STATION, MO 63103 | Service Inquiry | | | |

LEC: SBC ▼ ― 146

― Service Available Inquiry Information ─────148─────────────150─────

Service Definition
NC: HCMA    NCI: 02*
PIU: ☐    SECNCI: ☐    SPEC: ☐                                    Clear Optional Input
Location Code 1: ☐    Location Code 2: ☐
Quantity: ☐    Desired Due Date: ☐ mm-dd-yyyy Output Choices ─────154─────

| Status | LecID | Date | ID | NC/NCI |
|---|---|---|---|---|
| Reply Complete | Sbc | 10/15/1999 @ 02:34 PM | 10731 | HCMA/02* |
| Reply Seen | Sbc | 10/15/1999 @ 08:48 AM | 10462 | HCMA/02* |
| Reply Seen | Pac | 10/15/1999 @ 08:48 AM | 10461 | HCMA/02* |
| Reply Seen | Pac | 10/14/1999 @ 04:00 PM | 10460 | HCMA/02* |
| Reply Seen | Sbc | 10/14/1999 @ 03:59 PM | 10459 | HCMA/02* |
| Reply Complete | Sbc | 10/14/1999 @ 03:59 PM | 10458 | HCMA/02* |
| Error | Sbc | 10/07/1999 @ 04:59 PM | 10347 | HCMA/02* |
| Error | Pac | 10/07/1999 @ 04:58 PM | 10346 | HCMA/02* |
| Error | Pac | 10/07/1999 @ 03:59 PM | 10343 | HCMA/02* |
| Error | Sbc | 10/07/1999 @ 03:59 PM | 10342 | HCMA/02* |
| Error | Sbc | 10/07/1999 @ 03:30 PM | 10336 | HCMA/02* |
| Error | Pac | 10/07/1999 @ 03:30 PM | 10335 | HCMA/02* |
| Reply Complete | Pac | 09/01/1999 @ 09:39 AM | 10326 | HCMA/02* |
| Reply Complete | Pac | 09/01/1999 @ 08:54 AM | 10323 | HCMA/02* |

156 ─╯

152 ─╮   Send    Edit

Rapid Access Validation Engine

CFA Inquiry | Location Inquiry | Service Inquiry  HCMA/02*

IRI: Alternatives Available    LEC: Sbc    ID: 10741

Service Availability Input ─ 158

| NC | NCI | PIU | SENCI | SPEC | LOC1 | LOC2 | QTY | Avail. Due Date |
|---|---|---|---|---|---|---|---|---|
| HCMA | 02* | | | | | | | |

Service Availability Output ─ 160

| NC | NCI | PIU | SECNCI | SPEC | Loc1 | Loc2 | Available |
|---|---|---|---|---|---|---|---|
| HCMA | 02DSF44A | ??? | | THRU CONN SF/AMI | | | |
| HCMA | 02DSF44A | ??? | 02DSF44A | THRU CONN SF/AMI | | | |
| HCMA | 02DSF44A | ??? | 02DSF44B | THRU CONN SF/AMI | | | |
| HCMA | 02DSF44A | ??? | 02DSF44C | THRU CONN SF/AMI | | | |
| HCMA | 02DSF44A | ??? | 02DSF44D | THRU CONN SF/AMI | | | |
| HCMA | 02DSF44A | ??? | 02DSF44E | THRU CONN SF/AMI | | | |
| HCMA | 02DSF44A | ??? | 02DSF44F | THRU CONN SF/AMI | | | |
| HCMA | 02DSF44A | ??? | 02DSF44G | THRU CONN SF/AMI | | | |
| HCMA | 02DSF44A | ??? | 02DSF44H | THRU CONN SF/AMI | | | |
| HCMA | 02DSF44A | ??? | 02DSF44J | THRU CONN SF/AMI | | | |
| HCMA | 02DSF44A | ??? | 02DSF44 | THRU CONN SF/AMI | | | |
| HCMA | 02DSF44B | ??? | | THRU CONN SF/AMI | | | |
| HCMA | 02DSF44B | ??? | 02DSF44A | THRU CONN SF/AMI | | | |
| HCMA | 02DSF44B | ??? | 02DSF44B | THRU CONN SF/AMI | | | |
| HCMA | 02DSF44B | ??? | 02DSF44C | THRU CONN SF/AMI | | | |
| HCMA | 02DSF44B | ??? | 02DSF44D | THRU CONN SF/AMI | | | |
| HCMA | 02DSF44B | ??? | 02DSF44E | THRU CONN SF/AMI | | | |
| HCMA | 02DSF44B | ??? | 02DSF44F | THRU CONN SF/AMI | | | |

IRM ─ Records Found.

Close

FIG. 9

220 CFAs {
- H/PSWB/1999-07-22
- C/9501/T1//JNBOARMAK03/JNBOAR10W02
- C/9532/T1//LTRKARFRHA2/LTRKARFRK06 ⟵ 222 CFA
- C/9504/T1//LTRKARFRHA2/LTRKARFRK06
- C/9528/T1//LTRKARFR/LTRKARFRHA2
- C/9533/T1//LTRKARFRHA2/LTRKARFRK06
- C/9506/T1//FYVLARAFWCC/FYVLARHIK06
- C/9535/T1//LTRKARFRHA2/LTRKARFRK06 ⟵ 226 CFA
- C/9513/T1ZF//LTRKARFRHA2/LTRKARFRK06
- C/9512/T1ZF//LTRKARFRHA2/LTRKARFRK06
- C/9503/T1//FYVLARAFWCC/FYVLARHI

FIG. 11

```
H/PSWB/20000103
C/9532/T1//LTRKARFRHA2/LTRKARFRK06  ─── 222 CFA
I/A
R/63/XGGS/023283        /SW            01 A  ⎫
R/63/XHGS/029132        /SW            02 A  ⎪
R/63/XHGS/027206        /SW            03 A  ⎪
R/                             0406 S         ⎪
R/63/XHGS/027203        /SW            07 A  ⎪
R/                             08 S           ⎪
R/02/XHGS/100043        /GTEC          09 A  ⎪
R/63/XHGS/030085        /SW            10 A  ⎪
R/63/XHGS/030088        /SW            11 A  ⎪
R/63/XHGS/023826        /SW            12 A  ⎬ 224 Responses
R/63/XHGS/022787        /SW            13 A  ⎪
R/                             14 S           ⎪
R/63/XHGS/025089        /SW            15 A  ⎪
R/                             16 S           ⎪
R/63/XHGS/028713        /SW            17 A  ⎪
R/63/XGGS/029563        /SW            18 A  ⎪
R/63/XHGS/025241        /SW            19 A  ⎪
R/63/XHGS/024145        /SW            20 A  ⎪
R/                             2122 S         ⎪
R/63/XHGS/030078        /SW            23 A  ⎪
R/                             24 S          ⎭
C/9535/T1//LTRKARFRHA2/LTRKARFRK06 ─── 226
I/A
R/63/XGGS/023575        /SW            01 A  ⎫
R/                             02 S           ⎪
R/63/XHGS/022979        /SW            03 A  ⎪
R/63/XGGS/032683        /SW            04 A  ⎪
R/63/XHGS/029881        /SW            05 A  ⎪
R/63/LGGS/021698        /SW            06 A  ⎪
R/63/XHGS/031468        /SW            07 A  ⎪
R/                             08 R           ⎪
R/63/XGGS/031406        /SW            09 A  ⎪
R/63/XHGS/028962        /SW            10 A  ⎬ 228 Responses
R/                             11 S           ⎪
R/02/LGGS/200028        /GTEC          12 A  ⎪
R/63/XHGS/023783        /SW            13 A  ⎪
R/63/XHGS/029918        /SW            14 A  ⎪
R/63/XHGS/029949        /SW            15 A  ⎪
R/63/XHGS/022329        /SW            16 A  ⎪
R/63/XHGS/022350        /SW            17 A  ⎪
R/63/LGGS/022790        /SW            18 A  ⎪
R/63/XGGS/030802        /SW            19 A  ⎭
```

RECONCILING DATABASE INFORMATION AMONG SERVICE PROVIDERS

RELATED APPLICATIONS

This application is a continuation-in-part of U.S. patent application Ser. No. 09/776,785, filed Feb. 5, 2001 now U.S. Pat. No. 6,665,391, which is incorporated by reference herein in its entirety.

TECHNICAL FIELD

The present invention pertains generally to communications services and, more particularly, to a system for reconciling differences in database information among service providers maintaining separate databases.

BACKGROUND

Interexchange carriers who provide long-distance service to customers frequently place access service requests with local exchange carriers to arrange for voice and data connections to fulfill customer needs. An interexchange carrier may have to deal with a number of different local exchange carriers who provide the local services for such customers. Typically, a local exchange carrier (LEC) will make certain services available to business customers within the LEC's service area. For example, a LEC may provide a certain number of T1, T3, OC-48, etc. services that are provided between the customer and the LEC central office.

The business customer may wish to either activate or deactivate voice and data services as business needs either increase or decrease. For example, if a business customer desires to increase its service, a representative of the business customer will normally contact its interexchange carrier by phone and make a request for the additional service. The provisioner is the person at the interexchange carrier who takes the order from the business customer. The provisioner then processes the request on a prevalidation system. The prevalidation system allows the interexchange carrier to access the database of the applicable LEC to determine the availability of channels for the requested service. In other words, the prevalidation system obtains the circuit identification for the specific channels that are to be provided by the LEC to fulfill the particular service order.

After the provisioner performs a prevalidation request to determine availability of LEC resources, the submits an access service request (ASR) to the LEC using a separate ordering system. An access service request (ASR) is a formal request for the LEC to commit specific resources to fulfill a customer's service request.

The provisioner submits the formal ASR by keyboarding all of the detailed information regarding circuit ID's, service locations, service requests and other detailed information into an ASR ordering system. In accordance with the prior art, the ASR ordering system is separate from the prevalidation system used by the provisioner. In the process of re-entering data from the prevalidation system to complete an ASR, errors may be easily made by the provisioner. Further, other provisioners of the interexchange carrier may have also received requests from other representatives of the same business customer at approximately the same time which could result in the duplicate assignment of the same circuit IDs. This practice of separately performing prevalidation and re-keying of data into an automatic service request system are problematic for the interexchange carrier due to the time delay in placing the order and due to the costs and delays associated with the necessity to generate supplemental orders whenever the LEC rejects the service request.

A great deal of effort must be expended in tediously entering the detailed and extensive information of an access service request. Very often, the provisioners become very busy and are unable to prepare the service request immediately after it is requested by the business customer. Further, the inherent delays in placing an incorrect order, having that order rejected, and preparing a supplemental order can be costly to the interexchange carrier. Such a process of submitting a supplemental order may result in several days of delay, causing loss of revenue and customer dissatisfaction. Additionally, it costs the interexchange carrier time and money for the provisioner to prepare and submit the supplemental order.

Although the prevalidation process alone has reduced costly supplemental orders necessitated by errors, it would be advantageous to provide a system that facilitates service orders and even further reduces errors that can occur during the actual ordering process.

SUMMARY

The present invention overcomes the disadvantages and limitations of the prior art by generally providing a system for integrating prevalidation with service ordering to facilitate accurate preparation of service requests. In accordance with preferred embodiment, the present invention provides for an interexchange carrier to independently maintain records of available LEC resources. Although these records are maintained separately from the LEC, the records are maintained based upon the LEC's responses to prevalidation requests.

The present invention may therefore comprise a method of reconciling an interexchange carrier database with a local exchange carrier database, the method comprising: with the interexchange carrier database, locating circuit identification for circuits associated with a particular local exchange carrier that maintains the local exchange carrier database information; generating a batch file containing the circuit identification information for the particular local exchange carrier; generating prevalidation requests using the batch file to obtain status information from the local exchange carrier database pertaining to the circuits associated with the particular local exchange carrier; comparing the status information with data stored in the interexchange carrier database; reconciling differences between the status information and the data stored in the interexchange carrier database.

The present invention may further comprise a system for reconciling circuit assignment information stored by an interexchange carrier with circuit assignment information stored by a local exchange carrier comprising: an interexchange carrier database that stores the circuit assignment information; a prevalidation system that accesses the interexchange carrier database, generates a batch file of said circuit assignment information of the interexchange carrier, generates prevalidation requests to obtain corresponding circuit assignment information of the local exchange carrier, compares the circuit assignment information of the local exchange carrier with the circuit assignment information of the interexchange carrier and generates a report indicating differences in the circuit assignment information.

The advantages of the present system are that prevalidation requests can be made automatically as part of an ordering system since the prevalidation ordering system and the ordering system are integrated into a single system that utilizes at least a portion of the same data. In this fashion, the need to reenter data into the ordering system that has already been entered into the prevalidation system is eliminated.

Errors that can potentially occur upon reentering data are avoided. Further, delays and costs associated with preparation and submittal of supplemental orders can be substantially eliminated.

BRIEF DESCRIPTION OF THE DRAWINGS

The foregoing and other features and advantages of the invention are described in detail below with reference to the accompanying drawings, wherein

FIG. 4 is a screen printout of a CFA inquiry;

FIG. 6 is a screen printout of a location inquiry;

FIG. 7 is a screen printout of a response of location inquiry;

FIG. 8 is a screen printout of a service inquiry;

FIG. 9 is a screen printout of a response to service inquiry;

FIG. 11 is an ASCII file of CFA prevalidation requests;

FIG. 12 is an ASCII file of responses to CFA prevalidation requests;

DETAILED DESCRIPTION

To provide a clear teaching of the present invention, the making and use of the various exemplary embodiments are discussed in detail below. However, it should be appreciated that the present invention provides many applicable inventive concepts that can be embodied in a wide variety of specific contexts. The specific embodiments discussed are merely illustrative of specific ways to make and use the invention and do not limit the scope of the invention.

Figure 1:
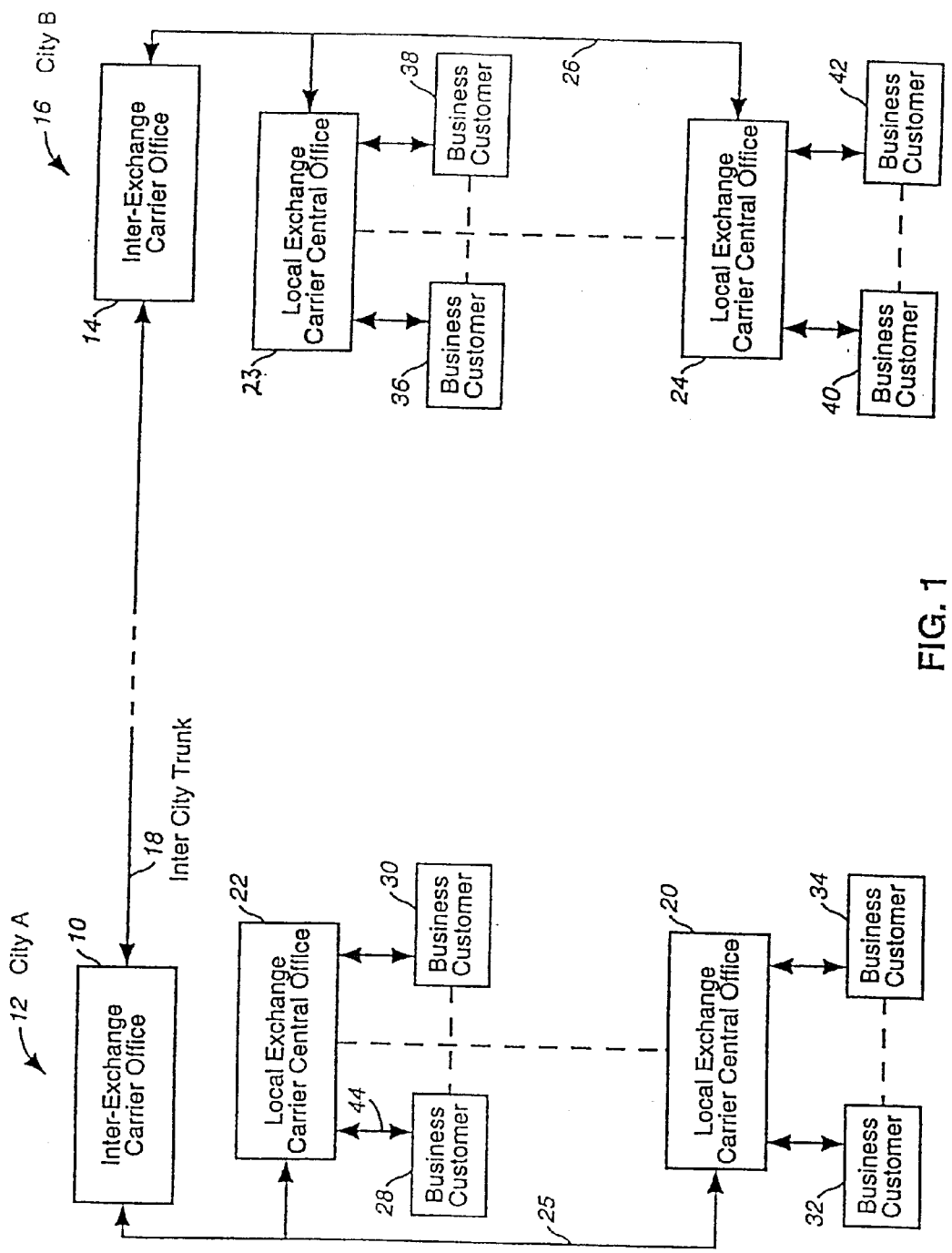
FIG. 1 is a schematic diagram illustrating the relationship of interexchange carrier offices with local exchange carrier central offices and business customers in two different cities.

FIG. 1 is a schematic illustration of the manner in which an interexchange carrier is connected to provide long distance data and voice services to business customers through local exchange carriers (LECs). As shown in FIG. 1, an interexchange carrier has an interexchange office 10 that is located in city A that is indicated by reference numeral 12. The interexchange office 10 is connected to an interexchange office 14, located in city B that is indicated by reference numeral 16, by way of an intercity trunk 18. Intercity trunk 18 may constitute a fiberoptic trunk, a microwave link or other communication links.

As is also indicated in FIG. 1, the interexchange carrier office 10 is connected via the high-speed connections 25 to a series of local exchange carrier central offices 22, 20 in City A. Similarly, the interexehange carrier office 14, that is located in City B, is connected to one or more local exchange carrier central offices 22, 24 via the high speed connections 26. Each of the local exchange carrier central offices is connected to a number of business customers. For example, the LEC CO 22 is connected to business customers 28 and 30; LEC CO 20 is connected to business customers 32 and 34; LEC CO 23 is connected to business customers 36 and 38; and LEC CO 24 is connected to business customers 40 and 42.

As can be seen from FIG. 1, for a business customer, such as business customer 28, to obtain the high speed data services offered by interexchange carrier 10, the local exchange carrier central office 22 must provide a connection to the interexchange carrier office 10. Typically, the business customer 28 contacts a representative of interexchange carrier 10 and asks to have those services provided. The interexchange carrier then contacts the local exchange carrier to provide the proper connections 44 from the business customer 28 through the central office 22 to interexchange carrier 10. These requests by the interexchange carrier of the local exchange carrier are referred to as access service requests (ASR). The present invention allows the interexchange carrier to query the backend systems of the local exchange carrier to obtain information relevant to (1) location, (2) service availability, and (3) connecting facility assignment (CFA).

Figure 2:
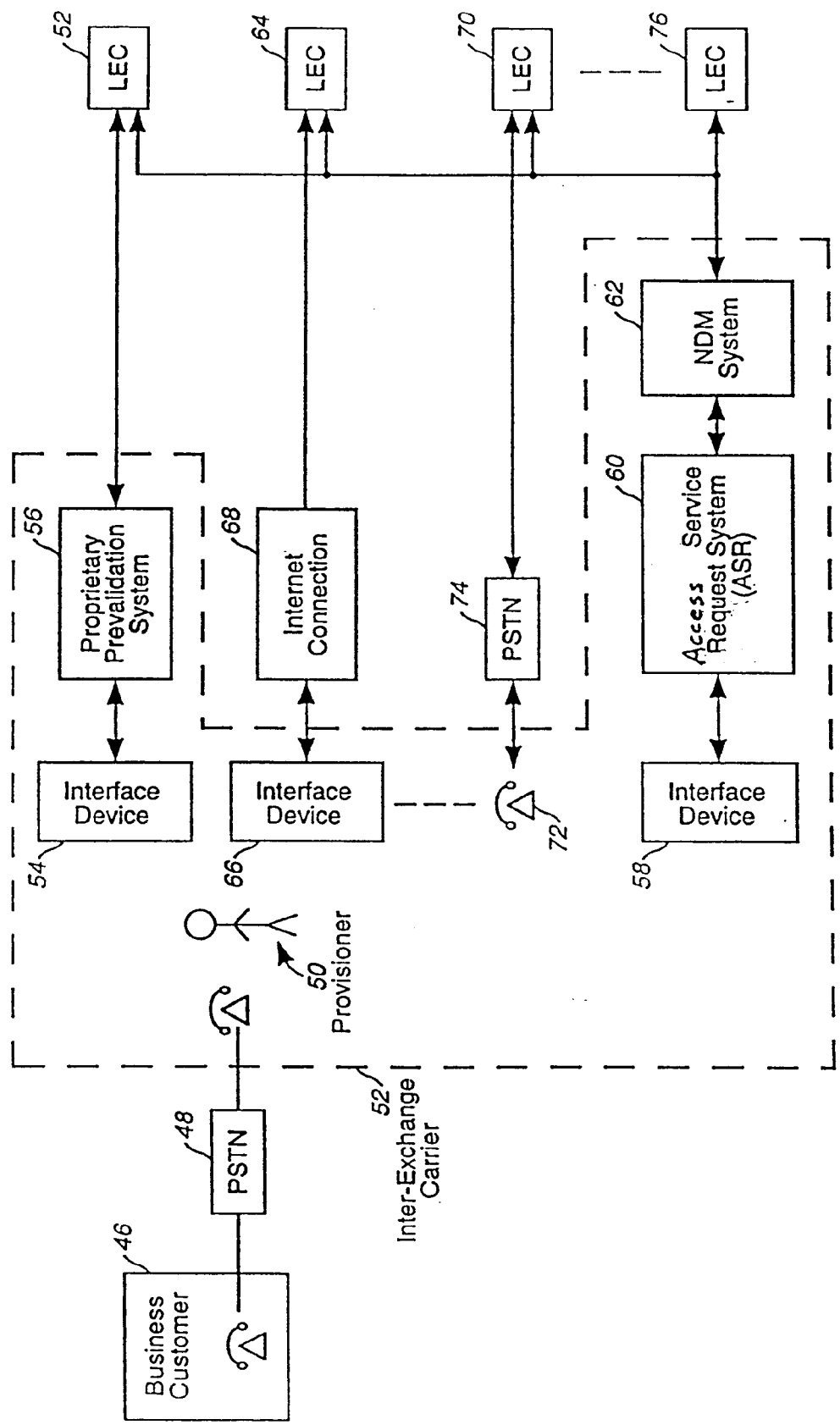
FIG. 2 is a schematic block diagram of the separate systems used for prevalidation and ordering.

For instructional purposes, FIG. 2 is a schematic illustration of a typical system that is currently in use but does not employ the aspects of the present invention. As shown in FIG. 2, a business customer 46 places a standard telephone call through the public switched telephone network 48 to a provisioner 50 who represents the interexchange carrier 52. The business customer 46 may request services such as additional T1 services, T3 services, etc. In response, the provisioner 50 first determines which LEC provides service to the business customer 46. Provisioner 50 then accesses an interface device, such as interface devices 54, 66, or 72 for obtaining a prevalidation of the requested service. For example, business customer 46 may be connected to LEC 52. In that case, the provisioner 50 would access an interface device 54 that is connected to a proprietary prevalidation system 56. For example, the proprietary prevalidation system 56 provides access to a log-in screen on a mainframe operated by LEC 52. Via the interface device 54, provisioner 50 may obtain access to certain prevalidation information held by LEC 52. That information can then be used by the provisioner 50 to be entered in the interface device 58 that is provided to the access service request system 60 and the network data mover (NDM) ordering system 62 to order the services from LEC 52.

Alternatively, other LECs, such as LEC 64, may provide a password-protected Internet web page that the interexchange carrier 52 can access. For example, provisioner 50 may utilize the interface device 66 to accomplish an Internet connection 68 to a password-protected web page provided by LEC 64. The password protected web page may provide certain information that can be used by the provisioner 50 to place an order through the ASR System 60 by separately entering that data in the interface device 58.

Further, some LECs, such as LEC 70, merely provide information by phone. The provisioner 50 must place a telephone call on telephone 72 through the public switched telephone network 74 to the LEC 70 to obtain provisioning information that can then be used by the provisioner 50 to enter into the interface device 58. Also, some LECs, such as LEC 76, may have no process available for obtaining provisioning information prior to actually submitting a request for service.

As a common theme in FIG. 2, the process of actually placing an order through a particular LEC is performed by the provisioner 50 entering data into the interface device 58. An industry standard electronic form for access service request is completed by the provisioner 50 which that includes the connecting facility assignment (CFA), the location of the access points for the business customer, service availability and a large amount of additional information. The CFA is a data structure that includes the facility type, facility designator and indicates the channels that are being requested. The location information indicates the location of the access point of the business customer to the LEC CO on one side, and the location of the access point of the interexchange carrier to the business customer at the local exchange carrier central office, on the other side. Provisioner 50 completes the electronic form that is sent to the access service request system (ASR) 60. Typically, the NDM system 62 is a batch program that runs periodically throughout the day, and collects all of the ASRs for a specific LEC. Periodically, the NDM system 62 then sends out all of the pending ASRs for a specific LEC. The NDM system is a commercially available system that complies with standard transfer protocols. The NDM system 62 defines an interface between the ASR 60 and LEC mainframe for placing orders with LECs. The NDM system provides a protocol that is designed to transfer data between the LEC mainframe and the ASR System 60. The NDM system 62 is commonly used in the industry for interfacing interexchange carriers with LECs to send ASRs.

Once the ASR has been transmitted to the LEC mainframe, the LEC mainframe reviews the ASR electronic forms to verify the completeness and correctness of the ASR. The LEC mainframe then transmits an acknowledgment of the request. The acknowledgment may indicate that the order is correct and complete and has been accepted, or the acknowledgment may indicate any errors in the ASR. For example, the acknowledgment may indicate that there is an error in the CFA, or the location information. If the order is rejected, a supplemental order must be prepared and sent through the system in the same fashion as the original ASR.

For each original ASR order and for each supplemental ASR order, a fee must be paid by the interexchange carrier 52. The provisioner 50 has placed the order with knowledge of what the provisioner thinks are correct CFAs, locations and service request information. Because of other orders going through the system and errors that may be made by the provisioner 50 in entering data in the electronic form in the interface device 58, supplemental orders may frequently be required. Typically, a given customer is served by a single interexchange carrier of the customer's choice. Consequently, multiple interexchange carriers are usually not competing for the same access facilities. Hence, it may be practical and advantageous for a database to be kept by the interexchange carrier 52 to keep track of what facilities are available from the LEC. This avoids the necessity of the interexchange carrier 52 contacting the LEC to determine the available facilities for fulfilling each ASR. Additionally, provisioners at interexchange carriers are often assigned to serving a particular customer. In this fashion, a given provisioner will become quite familiar with what facilities are available and the location of those facilities for each business customer. Even so, errors can still frequently be made because of typographical errors in entering the data and due to incorrect information that may have persisted for some time. For example, various systems may have been running for years and information may become lost or are inaccurate. An interexchange carrier 52 may show that a particular connection was disconnected, while the LEC system still thinks that that connection is active. These types of problems have led to an increased need for a standard method of prevalidating orders.

There is a substantial cost incurred for rejected orders. The delays in the connection of the customer to the system may damage customer relationships between the interexchange carrier and the business customer, and decrease revenues of the interexchange carrier during the delay period. Further, the additional labor of the provisioners 50 in re-entering data as supplemental orders is also costly to interexchange carriers, as pointed out above.

Industry standards have been adopted for prevalidation systems to provide a standard way of prevalidating orders. Original standards were developed by the Order Billing Forum (OBF) which instituted the idea of a standardized prevalidation system. The T1M1 Committee of the OBF then adopted standards upon which the system of the present invention is based. The standard has essentially adopted a gateway-to-gateway interface between the LEC backend and the interexchange carrier prevalidation system. The standard was written with the Common Object Request Broker Architecture (CORBA) as the communications standard for the gateways. CORBA allows disparate applications to communicate with one another. The T1M1 committee initially provided and defined the CORBA-style Interface Definition Language (IDL) by which objects interwork to accomplish the gateway-to-gateway interface. The ORB is the middleware that establishes the client/server relationships between objects. Using an ORB, a client can transparently invoke a method on a server object, which can be on the same machine or across a network. The ORB intercepts the call, and is responsible for finding an object that can implement the request, passes the parameters, invoke its method and then return the results. The client does not have to be aware of where the object is located, its operating system, or any other system aspects that are not part of the objectors interface. In so doing, the ORB provides interoperability between applications on different machines in heterogeneously distributed environments, and seamlessly interconnects multiple object systems.

The standards just described, however, relate to a prevalidation system and not the ASR/NDM system. There has been no contemplation in the industry of integrating the mechanisms of prevalidation with those of the ASR/NDM system.

Figure 3:
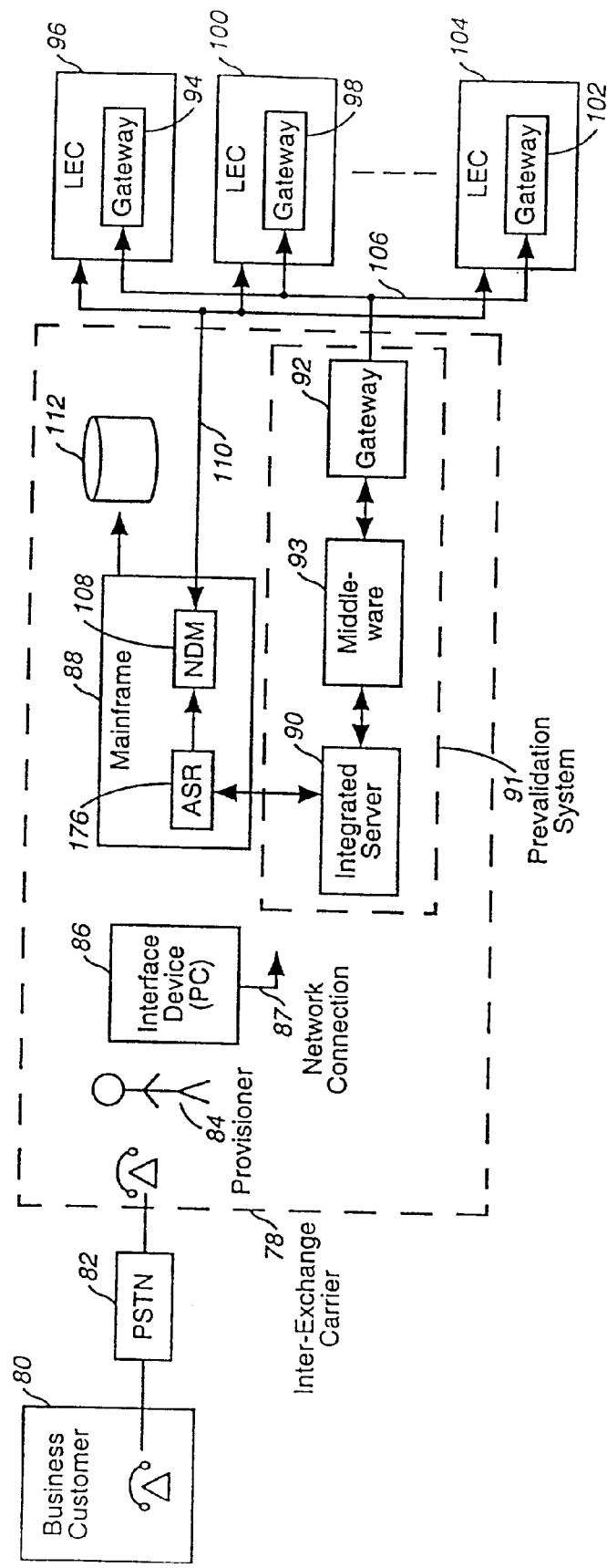
FIG. 3 is a schematic block diagram of the integrated system of the present invention.

FIG. 3 is a schematic illustration of a system as an exemplary embodiment of the present invention. The system illustrated in FIG. 3 integrates the mainframe ordering system of the interexchange carrier 78 with a prevalidation system. In accordance with FIG. 3, a business customer 80 may place a telephone call via the public switch telephone network 82 to a provisioner 84 located at the interexchange carrier premise 78. The business customer 80 may request additional services such as additional T1 services. The provisioner 84 can then enter the request in the interface device 86, such as personal computer that is connected to a network connection 87.

Provisioner 84 can log onto mainframe 88, or prevalidation system 91, using network connection 87. By logging onto the prevalidation system 91, single "stand alone" prevalidation requests can be made to obtain provisioning information. By logging onto the mainframe 88, an integrated process of prevalidating orders and placing orders can be performed. This integrated process uses the prevalidation system 91 and employs the electronic forms of the ASR 176 to generate prevalidation requests. Actual orders are placed using ASR 176 and NDM 108, which is explained in more detail below. Prevalidation calls are placed from the mainframe 88 to the integrated server 90 of prevalidation system 91. From integrated server 90, these requests then pass through middleware 93, which performs various functions described in more detail below. The requests are then passed to gateway 92 which transmits the requests to the appropriate LEC such as LEC 96, 100, or 104. The gateway communicates these requests by way of corresponding LEC gateways 94, 98, 102. The requests are transmitted via secure T1 lines 106. Orders from the NDM 108 are placed through secure T1 lines 110 to the appropriate LEC. Gateway 92 and gateways 94, 98, and 102 employ the CORBA middleware that is able to transmit a prevalidation request to the gateways located at the LECS.

The prevalidation requests are followed by responses from the LEC that are transmitted from the appropriate LEC gateway to gateway 92 of the interexchange carrier 78. These responses are then transmitted to the middleware 93 and integrated server 90, and back to the mainframe 88 and input device 86 where the provisioner 84 can view the response. Provisioner 84 can then use the data from the response, add further data that may be required to place the order, and then directly send the order on mainframe 88 as an access service request (ASR).

In operation, the provisioner 84 may complete different pages of the access service request upon receiving an order from a business customer 30. In accordance with a preferred embodiment, as each form of the ASR is completed, calls are automatically made through the integrated server 90, middleware 93 and gateway 92 to the appropriate gateway at the LEC. In this manner, data entered from the input device 86 is transmitted to the LEC as soon as it is sufficiently complete.

Once the ASR data is complete from the responses that are received by the prevalidation system, an ASR order may be placed through the NDM 108 via secured lines 110 to the appropriate LEC. The LEC then provides an acknowledgment of the ASR that either indicates that the ASR is complete and correct, or that it contains errors. Further, the LEC system is designed to indicate the type and location of the errors. All of this information is stored on storage device 112. If such errors are present, the provisioner 84 can make corrections to the ASR and resubmit the request as a supplemental request.

The system illustrated in FIG. 3 provides a capability of querying the backend systems of the LECs in real time for information that is relevant to (1) location, (2) service availability, and (3) connecting facility assignment (CFA). The pre-order validation system significantly reduces the number of supplemental ASRs that are sent to the LECs to correct rejected data. In addition, the system illustrated in FIG. 3 provides critical provisioning information to the interexchange carrier using the stand alone prevalidation requests. This information can then be used for future provisioning.

In that regard, the CFA information indicates the channels that exist within a leased facility that extend from the customer's actual control terminal location (ACTL) to a serving wire center (SWC), which is normally the LEC CO, as indicated in FIG. 1. The stand alone prevalidation process allows a provisioner to retrieve the status and relevant information from the LEC for specific channels, or a range of channels, of the CFA. The present implementation allows queries at the T1 through fiber levels.

FIGS. 4 through 9 illustrate various stand alone screens that can be accessed by the provisioner 84 using the input device 86. The integration process utilized in accordance with the present invention may incorporate data that is shown in these screens and place calls from the mainframe 88 to the LECs to automatically retrieve this data. However, FIGS. 4 through 9 also provide an indication of the type of requests that are made automatically using the integrated process of the present invention.

FIG. 4 is an illustration of a CFA inquiry. In this case, the provisioner may wish to determine the availability of channels in a CFA. As indicated in FIG. 4, a pull-down box 110 is used to select a particular LEC. For example, Southwestern Bell Corporation is shown in the pull-down box 110. The provisioner then inserts information in the CFA inquiry input section 112. Facility designators, as well as facility type and location A and location Z, are input by the provisioner 84. Additionally, channel information may be inserted, or the channel box may be left blank to determine the available channels. The provisioner is normally familiar with the facility designator input which constitutes the equipment ID on which the particular CFA inquiry is being made. The facility type is a particular type of service requested such as T1, T3, etc. Location A, as described above, is the location for the access of the interexchange carrier in the local exchange central office. Location Z is the access point of the business customer to the local exchange carrier central office.

As also shown in FIG. 4, the pre-populate option box 114 allows the provisioner to enter NetPro circuits or NetPro order numbers (i.e., mainframe IDs) if the provisioner is familiar with that data, to obtain desired information. (The term "NetPro" as used herein relates to conventions used by NetPro Computing Inc. of Scottsdale, Ariz.) Once the information is entered, the send box 116 is activated and calls are placed through the system illustrated in FIG. 3 to the LEC backend. The requested information is then returned, as indicated on the output choices box 118. The status box indicates the status of the data. A "Gateway Sent" response indicates that the CFA inquiry has been sent through the gateway to the LEC and no response has yet been received. A "Reply Complete", which is not shown in the list, indicates that a reply has been received from the LEC backend and has been stored as part of the functions of the prevalidation system 91 that is shown in FIG. 3. The status "Reply Seen" indicates that the provisioner has accessed the database in the prevalidation system 91 (FIG. 3) and has retrieved the data for review. The LEC ID box indicates the particular LEC which, in this case is Southwestern Bell Corporation. The date box indicates the date and time of the action indicated in the status box. The ID box indicates the ID that has been assigned by the prevalidation system 91 (FIG. 3). The CFA box indicates the ID of the CFA that corresponds to the CFA inquiry input. Any of the rows of information shown in the output choices 118 can be double clicked to retrieve more detailed data.

Figure 5:
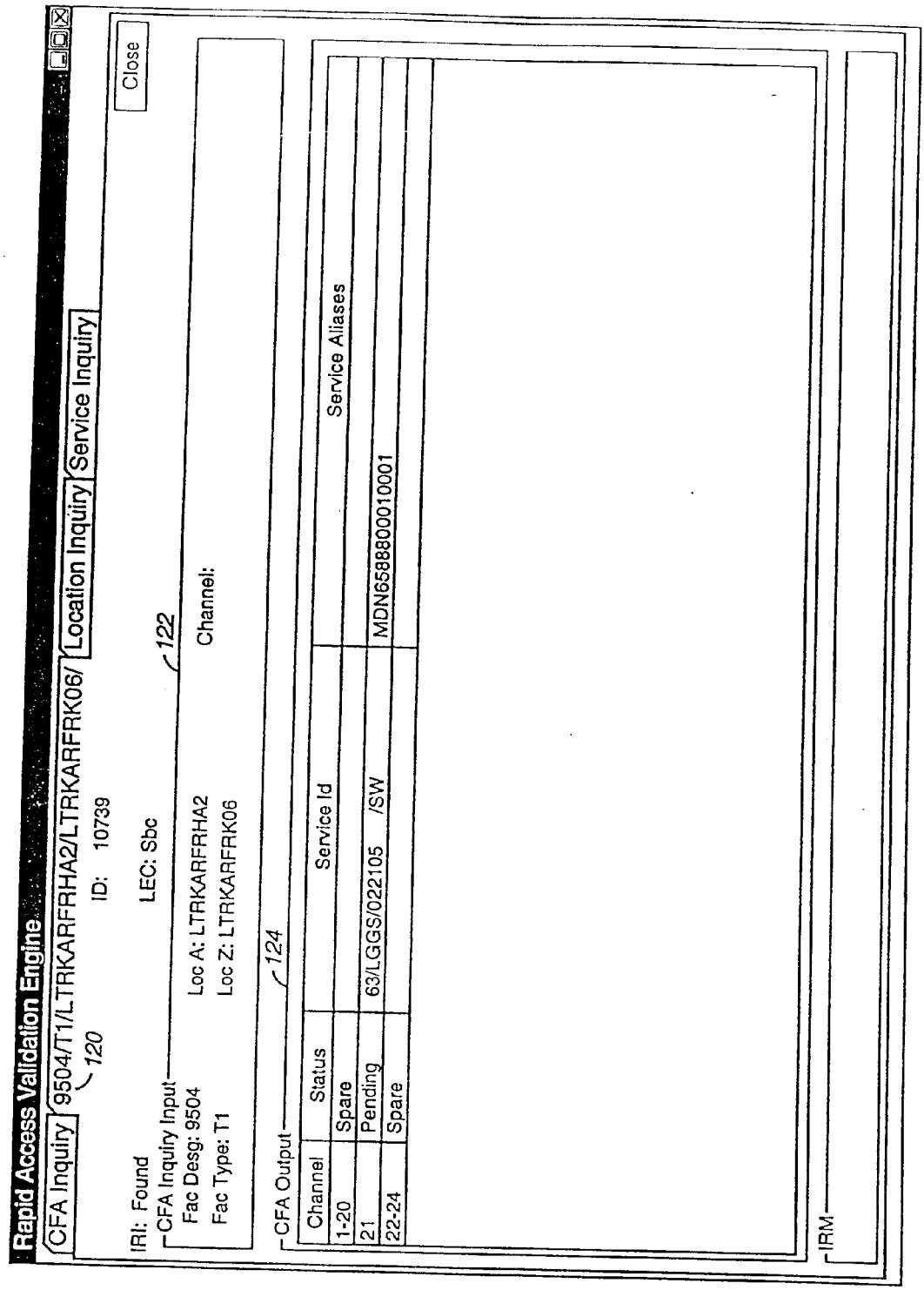
FIG. 5 is a screen printout of a response to a CFA inquiry.

FIG. 5 is a screen that indicates that the first row of information in the output choices box 118 of FIG. 4 has been double clicked to bring up additional information regarding that particular CFA. Of course, the status of the first line changed from "Gateway Sent" to "Reply Complete" prior to double clicking on the first row. As shown in FIG. 5, additional data is shown for the CFA that is indicated in the selection tab 120. The IRI indicates that the particular CFA that was being requested was found. The ID indicates the prevalidation system ID number that corresponds to the ID number of the first row of the output choices of FIG. 4. The LEC field identifies the LEC, which is Southwestern Bell Corporation. The CFA inquiry input box 122 indicates the particular data that was entered in the CFA inquiry input box 112 of FIG. 4. In other words, the CFA inquiry input box 122 is an indication of what was requested in box 112 of FIG. 4.

As also shown in FIG. 5, the CFA output 124 provides the response from the LEC as to which channels are available for the particular CFA that was requested. As shown in FIG. 5, channels 1 through 20 are available since the status indicates "Spare." Channel 21 has a "pending status" which indicates that there is probably a connection order that is pending for that particular channel. CFA output 124 also indicates that channels 22 through 24 for that particular CFA T1 line are also available. Since the channel information was left blank in the CFA inquiry input 122, the full range of availability of channels is provided in the CFA output 124. This assists the provisioner in assigning channels for the ASR request when an order is placed.

FIG. 6 is a screen print of a location inquiry that has been made by the provisioner. In other words, the provisioner 84 (FIG. 3) is determining information relating to physical locations that are necessary for inclusion in the ASR request. FIGS. 6 and 7 provide the location information that may be required by the provisioner to complete the ASR request. As shown in FIG. 6, a drop down box is used to select the type of location inquiry to be made to the LEC. Drop down box 126 indicates that the information requested is a "Descriptive Address." Other options in the drop down address may include a numbered address, an unnumbered address, CLLI codes, and ECCKT information (service ID). Drop down box 128 provides a selection for the particular LEC from which the information is being requested. The customer premises address box is the box in which the provisioner enters known information to obtain further location information. Since the "Descriptive Address" has been selected in box 126, the provisioner, in this example, has selected a building name which is "St. Louis Union Station". The provisioner also is aware of the postal code and that this building is located in Missouri. When other selections are made in the drop down box 126, other information can be included. For example, the name of the business customer may be included in the "CO. Name" box. The particular city in which the business customer is located can also be included. Alternatively, the provisioner can include ECCKT information in box 132. The provisioner may have particular ECCKT information for a desired location. The ECCKT information corresponds to a service ID, such as shown in box 124 of FIG. 5. Similarly, location code information can be entered in box 134 by the provisioner. The send box 136 can be activated by the provisioner to send a request through the system illustrated in FIG. 3 to the LEC backend.

The output choices box 138 of FIG. 6 shows a history of various calls that have been made to the LEC. The call corresponding to the information in the customer premises address box 130 is indicated on row 140 of the output choices box 138. As seen on row 140, a response has been returned as indicated in the status box of the output choices 138 on row 140 which indicates "Reply Seen." The LEC ID indicates the selected LEC and the date indicates the date and time of response. The ID number is the ID that is placed on the call by the prevalidation system 91. The data sent box indicates the customer premise address information 130 that was sent in accordance with the information entered in the customer premise address 130. By double clicking on row 140, the screen indicated in FIG. 7 is produced.

The screen illustrated in FIG. 7 indicates the specific data retrieved from the LEC for the "St. Louis Union Station" request. The customer premise address output box 144 indicates the detailed information regarding the St. Louis Union Station address. As indicated in box 144, a street name and address is provided, the floor location and room number are also provided that indicates the location of the particular equipment that has been searched. In other words, the information provided in box 144 indicates the locations of all of the equipment at the St. Louis Union Station address.

FIG. 8 illustrates a service inquiry screen. The drop down box 146 allows the provisioner to select a particular LEC for which the service inquiry is to be made. The "Service Available Inquiry Information" box 148 is a box in which the provisioner can enter information regarding service. As shown in FIG. 8, the service definition box 150 allows the provisioner to indicate the type of service that is being sought. As indicated in FIG. 8, a NC code of "HCMA" has been entered by the provisioner. This NC code is an equipment indicator. The NCI code of "02*" has been entered which constitutes a wildcard. Hence, all of the HCMA equipment will be provided by the LEC. The send box 152 is then activated by the provisioner. The output choices box 154 then indicates the status of the request. As indicated on row 156, the reply from the LEC has been received as indicated by the "Reply Completed" status signal. The LEC ID field indicates the appropriate LEC. The date field provides the date and time of the action indicated in the status box. The ID field constitutes the ID assigned by the prevalidation system 91. The NC/NCI field indicates the data that has been requested. By double clicking on line 156, the response is retrieved from storage in the prevalidation system 91 (FIG. 3) and the screen of FIG. 9 is produced.

FIG. 9 is a screen printout of a particular service inquiry request. As indicated in FIG. 9, the service inquiry request has an ID number of 10741. The service availability input box 158 indicates the information that was requested by the provisioner in accordance with FIG. 8. As shown, a NC number of "HCMA" was requested and the wildcard "02*" was requested for the NCI input. The service availability output box 160 indicates all of the HCMA information. For example, all of the NCI identification numbers for the HCMA equipment are provided. Additionally, the secondary NCI equipment information is also listed in the NC/NCI field. Various specification information is listed in the "Spec" field.

Figure 10:
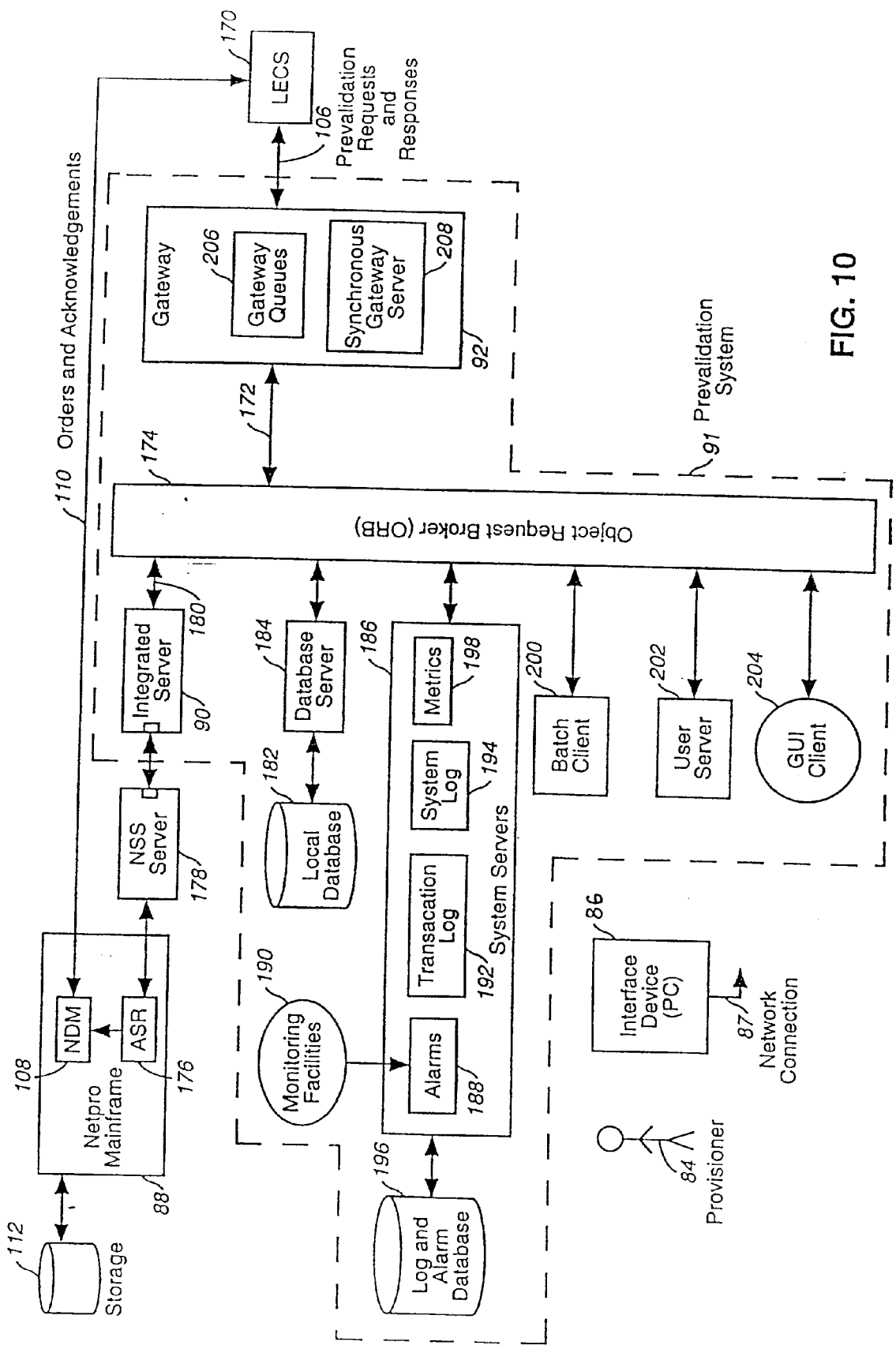
FIG. 10 is a more detailed block diagram of the integrated system of the present invention.

FIG. 10 is a schematic block diagram of the basic structure and functioning of a system in accordance with a preferred exemplary embodiment of the present invention. In FIG. 10, the basic structure illustrated in FIG. 3 is shown with additional details. Provisioner 84 enters information on the interface device 86 which may be logged onto the NetPro mainframe 88 to perform an integrated process of prevalidation and ordering, or which may be logged onto GUI client 204 to perform stand alone prevalidation requests. The NetPro mainframe 88 is connected to storage device 112 that archives information relating the requests, orders and acknowledgments that have been made by the NetPro mainframe 88. The NDM interface device 108 is connected to secured line 110 that is connected to the backend systems of LEC 170. Orders and acknowledgments are transmitted between the backend of LEC 170 and the NDM interface device 108 via secured line 110. Prevalidation requests and responses are synchronously transmitted between gateway 92 of the interexchange carrier and a similar gateway of LEC 170 via secure line 106. Information from gateway 92 is asynchronously communicated between ORB 174 and gateway 92 via link 172. Prevalidation requests and responses are transmitted between the ASR 176 and the NSS 178 synchronously. Similarly, prevalidation requests and responses are synchronously communicated between NSS 178 and the integrated server 90. The integrated server 90 asynchronously communicates with ORB 174 of prevalidation system 91 via connection 180.

In FIG. 10, ORB 174 functions as an interface for various functions that are performed by the prevalidation system 91. For example, a local database 182 is connected through a database server 184 to ORB 174. The ORB constitutes middleware that employs the CORBA software. The database server 184 and local database 182 constitute a local database. This database stores all of the transactions that are performed by the prevalidation system 91. The prevalidation system 91 relies upon database server 184 and local database 182 for persistence so that, if anything happens, the data has been stored in local database 182. When a transaction is received by prevalidation system 91, the first thing that occurs is that the transaction is stored to database 182 so that it can be retrieved if there is a system problem. Database server 184 and local database 182 may also be used for auditing, as disclosed in more detail below.

Various system servers 186 also interface through the ORB 174, as illustrated in FIG. 10. For example, an alarm server 188 utilizes a standard third party tool called "Patrol" for its monitoring facilities 190. Monitoring facilities 190 may, for example, monitor the connection to the LEC. If the connection fails, then the monitoring facilities 190 instruct the alarm server to set an alarm. The systems servers 186 also includes a transaction log server 192 and a system log server 194. The transaction log server 192 logs each of the transactions that is placed through the prevalidation system 91 and stores this information in the log and alarm database 196. Similarly, system log server 194 logs all of the systems activities in the log and alarm database 196. Alarm server 188 logs each of the alarms in the log and alarm database 196. The metric server 198 determines metrics for the operation of the system illustrated in FIG. 10, including response times of LEC 170. These metrics are also stored in the log and alarm database 196. This metric information can be very useful in analyzing the abilities and limitations of the LEC backend systems. The metric server operates by making time stamps to determine how long it takes to process a prevalidation order through the prevalidation system 91. An accounting can be made of the location of delays that occur both in the prevalidating system 91 and at the LEC. For example, the prevalidation system 91 may experience a very high volume of requests which requires queuing a number of calls and handling them on a delayed basis. In this fashion, the determination can be made as to the apportionment of the delay period between the prevalidation system 91 and the LEC.

Such delays may motivate the interexchange carrier to use an alternative to communicating real-time prevalidation requests with the LEC. For a variety of reasons, the interexchange carrier may desire to maintain its own set of records regarding LEC facilities. One application of such information would be in originating ASR's without having to go to the LEC for immediate prevalidation. The IXC's own database of available LEC facilities can reasonably be maintained with sufficient accuracy due to the aforementioned aspects that provisioners often specialize in serving one customer and that there is typically only one IXC serving a given customer location.

In accordance with a preferred embodiment of the present invention, the IXC's independent records are maintained by the submitting of batches of prevalidation requests at prearranged times when the demands on the LEC backend systems are expected to be particularly low. As described later in conjunction with FIGS. 13 and 14, this process of using prevalidation requests enables comparison and reconciliation between the IXC and LEC resource allocation databases.

Continuing with FIG. 10, batch client 200 operates in conjunction with the NetPro mainframe 88 and storage device 112 to provide reconciliation between the prevalidated responses and the ASR acknowledgments, as disclosed in more detail below. User server 202 also interfaces with the ORB and functions as the interface for the prevalidation system 91. All of the external clients that access prevalidation system 91 are processed by user server 202. GUI client 204 is also processed by user server 202 and provides a GUI interface for the stand alone inquiries that are made by provisioner 84.

As indicated above, the prevalidation system 91 operates asynchronously. The gateway queues 206 of gateway 92 queue up the asynchronous requests transmitted by the prevalidation system 91 to the gateway 92. The synchronous gateway server 208 then interacts with the LEC 170 on a synchronous basis as indicated above. In this fashion, the asynchronous nature of the prevalidation system 91 can be maintained in an environment of synchronous communication with the LEC 170.

In operation, the provisioner 84 uses interface device 85, such as a PC, that has a network connection 87. Network connection 87 allows a provisioner 84 to log on to either the NetPro mainframe 88 or into the prevalidation GUI client 204 to access the computing devices on which the prevalidation system 91 is operating. By logging directly into GUI client 204 of ORB 174, the provisioner can utilize GUI client 204 to make stand alone prevalidation requests, as illustrated in FIGS. 4 through 9. When logging directly onto the NetPro mainframe 88, the provisioner accesses the ASR 176 process to generate access service requests. The access service request process is an integrated process that uses a series of electronic forms to generate access service requests. As each electronic form is completed and if the form makes use of prevalidated data, the ASR 176 automatically generates prevalidation requests, which may involve a number of calls for completing a single electronic form. Once the responses for the prevalidation request are received by the NetPro mainframe 88, an order is submitted through NDM 108 via secured line 110, as described above. In this fashion, an integrated process of prevalidation and ordering is provided in accordance with the present invention. The stand alone prevalidation requests that utilize GUI client 204 are used primarily by the provisioner 84 to obtain information regarding available channels, location information, and service inquiry information, as indicated above, with respect to FIGS. 4 through 9.

In the process of placing an order that uses the system illustrated in FIG. 10, the NetPro mainframe 88 utilizes NSS server 178 to interface with the integrated server 90. The integrated server 90 communicates with the ORB 174 using the CORBA middleware. However, integrated server 90 must communicate with the mainframe utilizing a communications protocol compatible with the NSS server 178. Although CORBA could be used on the NetPro mainframe 88, it happens to be difficult and expensive to implement. The NSS server 178 is based on OS/2 server platforms and functions as a middleware client server architecture. The NSS server utilizes ABUs which are Atomic Business Units. As such, specific business logic runs on the NSS server 178. A module is created in the NSS server 178 to communicate with the integrated server 90 via a TCP/IP socket call. In operation, the NetPro mainframe 88 makes a call to the ABU of the NSS server 178, and the ABU uses a TCP/IP socket call to the integrated server 90. The integrated server makes a socket available via TCP/IP protocol. Integrated server 90 translates the data from the TCP/IP socket call into the CORBA structures that can be communicated through the ORB 174. The TCP/IP socket call provides data that isin the form of a flat delimited string. The integrated server 90 converts the flat delimited string of data into the CORBA data types. The integrated server 90 then makes a call into the prevalidation system 91. The integrated server 90 is also able to communicate with the ORB 174 an asynchronous manner, as indicated above. Hence, the integrated server is able to deal with the synchronous transmission of data from the NSS server 178 and provide data to the ORB 174 asynchronously. The integrated server 90 holds the socket connection to the mainframe open while the integrated server 90 collects the responses returned from the ORB 174. When the responses are received, the integrated server sends 90 the response to the mainframe 88. In this fashion, the mainframe 88 can operate synchronously while the integrated server 90 deals with the asynchronous aspects of the ORB system 174. It is important to note, however, that multiple inquiries can be made by the NSS server 178 into the integrated server 90 while each call is being held open. In this fashion, the NetPro mainframe 88 and the integrated server 90 can operate with parallel requests and responses. The integrated server 90 makes the multiple calls into the ORB 174 so that multiple calls may be transmitted through gateway 92 nearly simultaneously.

A reconciliation process can also be performed by the system illustrated in FIG. 10. As indicated previously, storage device 112 maintains all of the information regarding all of the orders and supplemental orders that are processed by the ASR system 176, as well as all of the acknowledgments that are received from the LEC 170. Various programs that are run by the NetPro mainframe 88 accumulate that data and generate a table of CFAs that are stored in storage 112. The table of CFAs indicates all of the CFAs that are utilized by the interexchange carrier 78 (FIG. 3). In other words, the interexchange carrier 78 keeps track of the status of each of the CFAs including the assignments of channels for each CFA.

The reconciliation process utilizes this table of CFAs to reconcile the interexchange carrier CFA data with the LEC CFA data. Any differences between this data can then be reconciled with the LEC. This reconciliation process can be performed using the functions of the prevalidation system 91.

The prevalidation system 91 may periodically generate a query to the NetPro mainframe 88 to obtain the table of files that is stored in storage 112. These files are then sent, using the well known file transfer protocol (FTP), to the prevalidation system 91. The batch client 200 of the prevalidation system 91 then reads these files. FIG. 11 illustrates a sample table of a series of CFAs to 20. FIG. 11 is a sample of what may appear as a much more comprehensive table of files that is stored in storage device 112. As can be seen in FIG. 11, each CFA constitutes a separate row in FIG. 11 and includes the circuit identification information. CFAs are stored in the table as an ACSII file, as shown in FIG. 11. As indicated above, the batch client 200 reads each of the CFAs line by line and generates prevalidation inquiries that are transmitted to the LEC in the manner described above. This occurs during slow periods, such as at night when prevalidation system 91 is not in use. Since the LECs do not charge for prevalidation inquiries, the only cost to the interexchange carrier 78 is the cost of running the prevalidation system 91.

The LEC 170 provides responses in the manner described above. These responses are placed in a response file by the batch client 200. A typical response file is shown in FIG. 12. As indicated in FIG. 11, one of the CFAs is CFA 222. Referring to FIG. 12, the responses 224 from the prevalidation request for CFA 222 are provided. As shown in FIG. 12, channels 1, 2, and 3 are assigned. Channels 4 through 6 are spare channels that are available for assignment. Further, channels 8, 14, 16, 21, 22 and 24 are spare channels, while channels 7, 9 through 13, 15, 17 through 20 and 23 have been assigned.

As also shown in FIG. 11, one of the CFAs is CFA 226. FIG. 12 indicates the responses 228 for CFA 226 although not all of the responses are shown. The response reports which is shown in FIG. 12 are FTP'd back to the mainframe 88. The mainframe then generates reports that show the differences between the CFA data that is stored in storage device 112 and the response files that are shown in FIG. 12. The mainframe 88 generates reports that only show the differences between the response files of FIG. 12 and the CFA data that is stored in storage device 112. If differences exist, circuit IDs are compared with assigned purchase order numbers to provide additional information regarding the assignment of channels for the CFA. Additionally, circuit information may be used to provide additional evidence of the assignment of channels. In one implementation, a temporary database is generated by the NetPro mainframe 88 with the purchase order number associated with the CFA and the channel assignments. A comparison can then be run and, if there are differences, a purchase order number can be used to determine where the problem has originated. This information can then be used by personnel at the interexchange carrier to either adjust the interexchange carrier database to correct a system error in the interexchange carrier system or adjust the database of the LEC. Further, this information can be used to make billing corrections.

The system depicted in FIG. 10 can also perform auditing functions. As pointed out above, the system illustrated in FIG. 10 can operate as an integrated prevalidation and ordering system in which prevalidation requests and responses are automatically generated as each electronic form is completed when data is entered, while placing an order. As indicated above, prevalidation responses can be received prior to submitting each service order. The NetPro mainframe 88 generates a file of these prevalidation responses and the resultant service order acknowledgments that are provided by LEC 170. Occasionally, an order will be prevalidated and an acknowledgment is returned that rejects the order. Since the prevalidation has occurred just previously to the placement of the order, the order should not have been rejected and the interexchange carrier should not have to pay for a supplemental order. The file that is generated by the NetPro mainframe 88 includes each of the rejected acknowledgments and accepted prevalidation responses. Further, additional information may be provided such as purchase order numbers and other data fields such as the "Ver" field, the "Form ID" field, the "Field ID" field, the "Date and Time of Validation" field, the "Rave Request ID" field, the "Rave Response" field and the "User Action" field. Upon acknowledgment, the ASR system determines the field that is in error. The mainframe 88 then determines the corresponding response for this field from the database record. The ASR system then updates the file for this database pair with the error condition. This error condition can be used for reporting purposes. The mainframe 88 then generates a report that can be used for auditing costs that are incurred by the interexchange carrier in generating a supplemental report. The report includes information as to the number of ASRs that were rejected because of a provisioner override of an error condition. It may also report the number of ASRs that were rejected even though the validation process was successful. The ASR system can post the response data for user review. Information in the report is useful to determine whether an action should be taken to call the LEC for explanation or to correct the ASR and resend the order. The report can be automatically generated and sent to the billing department for auditing purposes or to the LEC. The file, of course, can accumulate this data over a period of time and then forward the report to the accounting office on a periodic basis, such as once a week or once a month. In this fashion, the accounting office can provide evidence for refund of charges on supplemental orders.

Further, the NetPro mainframe 88 can store accepted prevalidation responses that are received as part of the integrated prevalidation and ordering process. In the process of generating prevalidation requests in the integrated prevalidation and ordering system, each of the prevalidation requests can be compared to prevalidation responses that have been previously accepted and stored in a file by mainframe 88. If the circuit identification and channels of a subsequent prevalidation request are the same as a previously accepted prevalidation response, a rejection signal can be generated by the NetPro mainframe 88 to prevent the submission of the service order. In other words, if the interexchange carrier has already prevalidated an order, that order is reserved in the system so that there are not conflicts between orders.

Of course, information stored in the files by the mainframe for both the auditing and the prevalidation reservation processes includes information that must be provided by the prevalidation system 90. Queries may be made by the mainframe 88 to the prevalidation system 91. Specifically, these queries may be processed by the user server 202 which generates a database call to the database server 184 and local database 182. In this fashion, the data residing within the prevalidation system 91 can be provided to the mainframe 88 to provide the necessary data for the reconciliation files, the audit files and the prevalidation reservation files.

The present invention therefore provides a unique system that is capable of providing an integrated process for prevalidation and ordering, as well as providing for stand alone inquiries to obtain information from the LEC. The present invention is capable of providing a database of information that can be used by a provisioner to place orders and reconciling that database with the LEC database to ensure that proper information is provided. In this fashion, costs can be greatly reduced by avoiding the submission of supplemental orders that are based upon incorrect information. Further, savings can be provided by identifying incorrect data that is being used by the LEC.

The present invention is also capable of providing auditing information that can be used to audit charges that have been incurred by the interexchange carrier as a result of a rejected acknowledgments that have followed accepted prevalidation responses in the integrated prevalidation and ordering system. Reports can be generated that can be used by the accounting department and sent directly to the LEC for resolution. Additionally, a prevalidation request can be reserved in the system illustrated in FIG. 10 by storing a record of each prevalidation response that has been accepted and comparing them with each subsequent prevalidation request. In this fashion, conflicting requests that are made at nearly the same time do not result in any overlap and will avoid submission of conflicting orders.

In conjunction with both FIGS. 13 and 14, a process will now be described for reconciling records of facilities maintain by separately by an IXC and an LEC. Those of skill in the relevant art will recognize that this process may be generalized to the situation wherein a first service provider wishes to separately maintain a database that reflects the same information as that of a second service provider.

Figure 13:
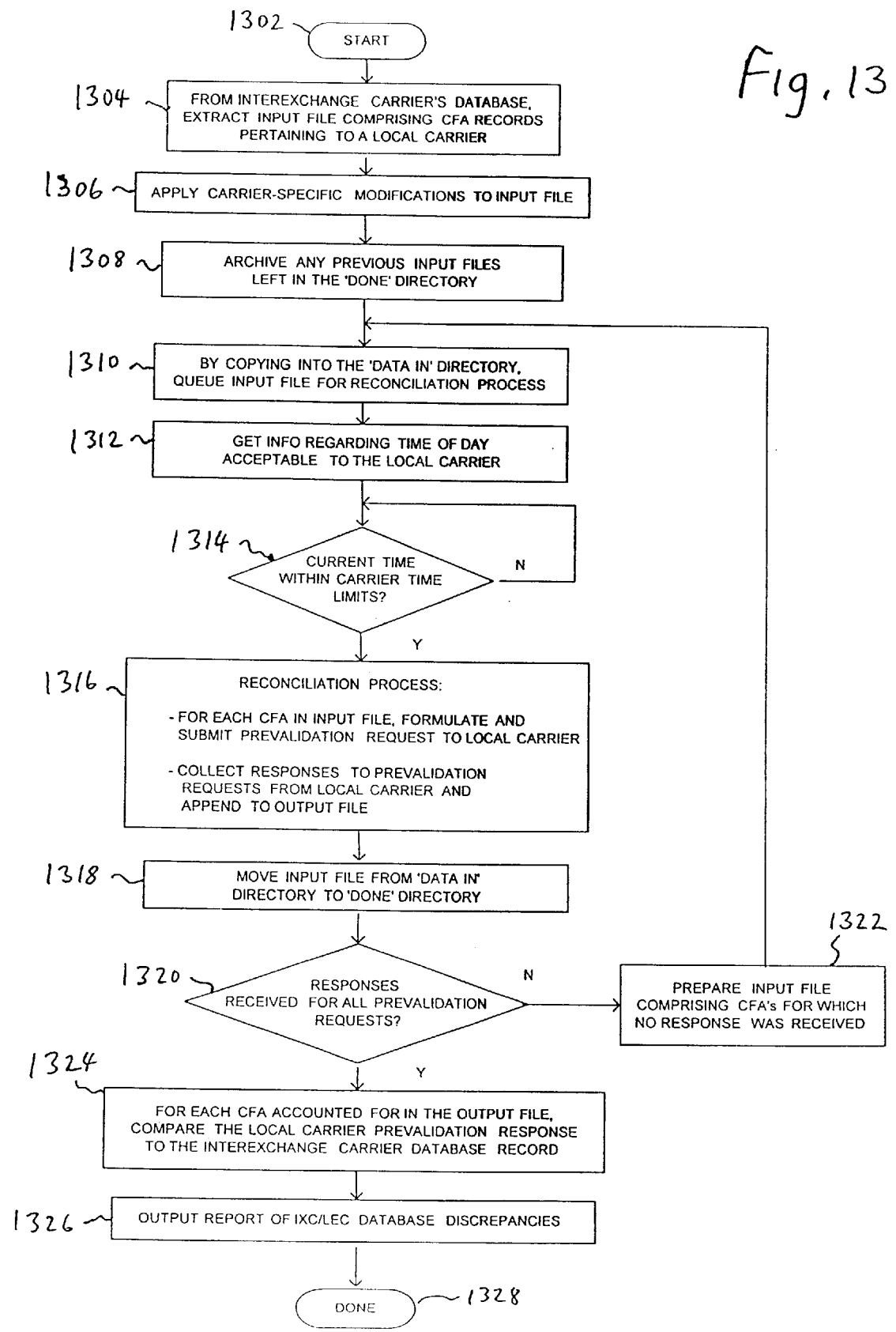
FIG. 13 depicts a process, in accordance with a preferred exemplary embodiment of the present invention, by which information among service providers may be automatically reconciled.

FIG. 13 describes the steps in a reconciliation process 1300 whereby prevalidation requests are used to check agreement between an IXC database and a LEC database. Such use for prevalidation requests is novel and unobvious. FIG. 14 is a functional block diagram depicting how prevalidation request are formulated and routed to accomplish database reconciliation. While the various functions and data file locations shown in FIG. 14 may be certainly implemented in the context of the systems shown and described in FIGS. 3 and 10, such functions are not confined to any direct mapping to physical elements and may in fact be implemented in a variety of ways. In some respects, FIG. 14 affords a clearer view of data flow in the course of performing database reconciliation independently of the apparatus used.

Figure 14:
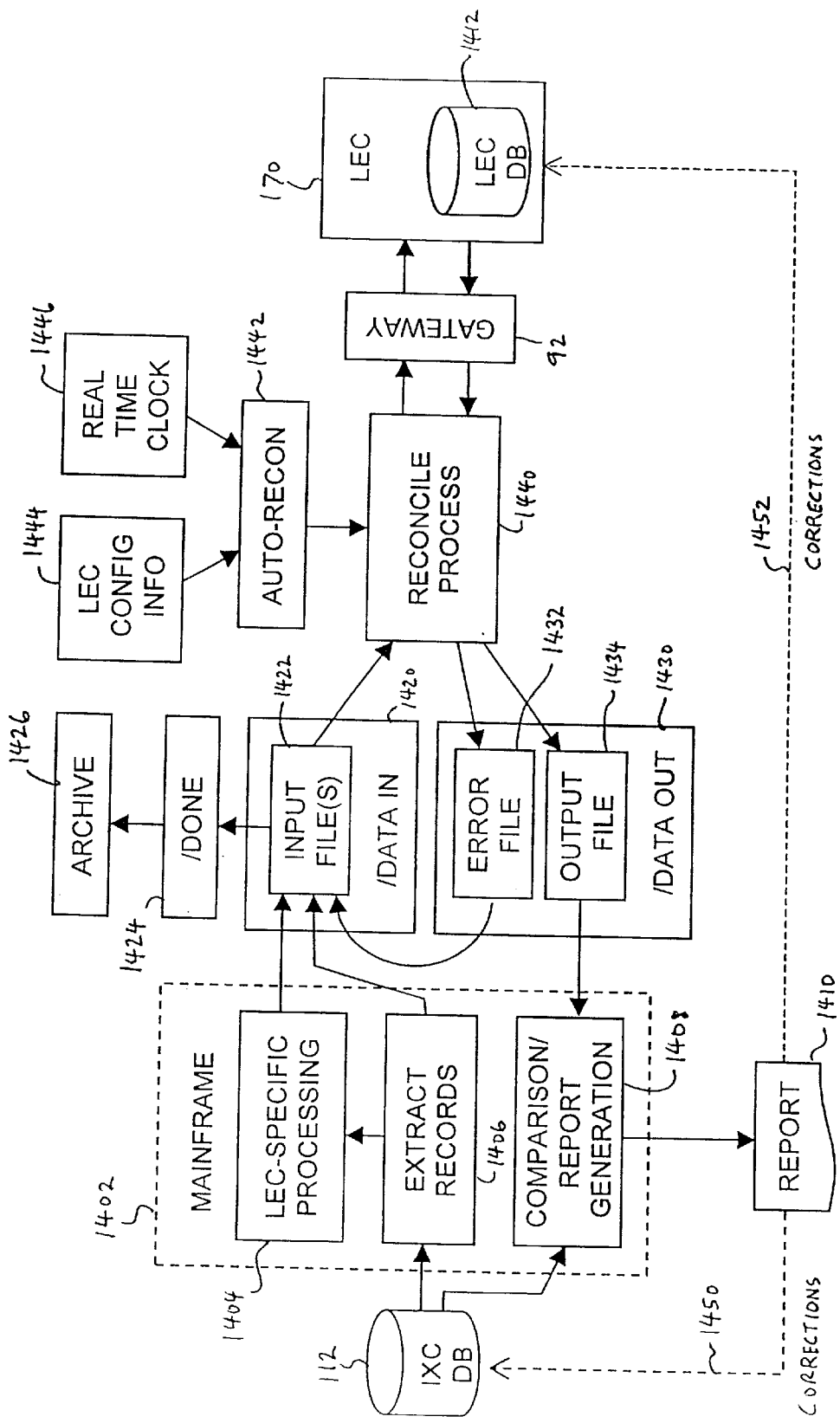
FIG. 14 is a schematic describing how information among service providers is automatically reconciled.

In FIG. 14, IXC database 112 is to be compared to and reconciled with a body of information owned by LEC 170 pertaining to the availability and status of service-providing facilities. This information is represented by LEC database 1412, although in actuality such information may reside in a number of locations and in a variety of forms.

A mainframe computing environment 1402 is able to access IXC database 112 and is shown to host at least three types of processes. Function 1406 performs the extraction of records from database 112 pertaining to a particular LEC. Correspondingly, process 1300 of FIG. 13 commences at step 1302 when a reconciliation 'cycle' is initiated in the context of a given LEC. In step 1304 of process 1300, function 1406 extracts records from database 112 pertaining to the particular LEC. It is contemplated that the extraction may yield a subset of records based upon some maximum number of communications that the LEC can handle during a single reconciliation session.

The extracted records from function 1406 may be suitable 'as is' for further processing or may require some modification to accommodate a given LEC. For example, it is known that one LEC does not support 'wild card' or open-ended requests and insists that the requests identify specific facilities. Accordingly, prevalidation requests bound for this LEC must be expanded to specify channels or ranges of channels for which information is sought. Thus, process 1300 includes step 1306 wherein function 1404 is invoked to perform any LEC-specific processing required before further processing of the extracted records.

With of without LEC-specific processing, records extracted from database 112 arrive at an '/data in' file location 1420 as one or more input files 1422. Location 1420 may be a directory in a computer file system. Prior to transferring extracted records into such a location, however, certain files from previous sessions must first be cleared out. The '/done' directory or location 1424, holds copies of input files that have been processed by reconcile process 1440 which is described later. The 'archive' location holds copies of input files that have been processed in past reconciliation processes, including perhaps those involving other LECs. To initialize the file locations, step 1308 of process 1300 prescribes that all files in the '/done' location 1424 be moved to archive location 1426. Presumably, the '/data in' location has been left empty by the successful completion of a separate or previous reconciliation session.

After archiving as necessary in step 1308, step 1310 is performed to move the records extracted by extract function 1406, and perhaps modified by LEC-specific processing function 1404, into an input file 1422 so that they are accessible to reconcile process 1440. In practice, reconcile process 1440 happens to run in a separate computing environment outside of mainframe 1402 and the placement of files into, the '/data in' location is done by file transfer.

In FIG. 14, a record of LEC configuration information 1444 holds information regarding the terms or preferences under which the LEC has agreed to support batched prevalidation requests from the IXC. For example, LEC configuration record 1444 may communicate preferred times of day or maximum request quantities that the IXC may be obligated to observe.

Automatic reconciliation process 1442 retrieves such information from LEC configuration record 1444 and determines when to start and stop reconcile process 1440 in compliance with the LEC preferences. Automatic reconciliation process 1442 automatically controls when reconcile process 1440 operates and uses input from real-time clock 1446 to obtain the real-world time of day for this purpose.

Worth noting with regard to configuration record 1444, it is conceivable that the records extraction function 1406 may have access to the same or a similar configuration file for adjusting the number of records extracted from database 112. Furthermore, LEC-specific processing function 1404 may also have access to the same set of configuration information for describing the LEC-specific requirements which may necessitate modifying the extracted records. Particularly in an implementation where these functions are hosted on a common computing platform, a single common configuration file for each LEC is reasonable and probably preferable.

Step 1312 of process 1300 refers to the automatic reconcile process 1442 retrieving the permitted running times from configuration record 1444 and then step 1314 depicts the action of process 1442 in waiting until the permitted start time has arrived before reconcile process 1440 is triggered.

Step 1316 relates to the reconciling process, per se, as takes place in block 1440 of FIG. 14. For each CFA record in input file 1422, reconcile process 1440 composes a standard prevalidation request and sends the request to LEC 170 through gateway 92 described earlier. As responses to the prevalidation requests are received back from the LEC through gateway 92, reconcile process 1440 accumulates two files in '/data out' location 1430. An output file 1434 contains records for which some valid response has been received from LEC 170. An error file 1432 is also formed, if necessary, to contain any CFA records for which no useful response is received from the LEC. This may be due to a transmission error or due to simple time-out conditions between the IXC and LEC processing systems.

In step 1318, as an input file 1422 is recognized and handled by reconcile process 1440, the input file is moved to the '/done' location 1424 to represent that it has been processed and to avoid re-triggering of the reconcile process upon the same set of records. Keeping the recently processed input file readily available facilitates ad hoc activities by engineers under certain circumstances, such as troubleshooting of the reconciling system.

In step 1320, it is determined whether a valid response has been received for all prevalidation requests submitted thus far. This will be evident from output file 1434 having all records accounted for and error file 1432 being empty or non-existent. If, in step 1320, it is determined that some prevalidation requests did not elicit valid responses from the LEC, then, in step 1322, the errant records listed in the error file 1432 are resubmitted in the form of an input file 1422.

When all prevalidation requests have been properly answered, then execution proceeds to step 1324 wherein the completed output file is provided to a comparison and report generating process 1408. By having access to IXC database 112, process 1408 may compare the IXC information to that within LEC database 1412 as ascertained by prevalidation requests. Process 1408 may then, in step 1326, issue a report of the discrepancies therebetween. Even though process 1300 then terminates in step 1328 after such as report has been provided as output, there maybe additional actions to bring database 112 and database 1412 into agreement.

Issuing from report 1410 in FIG. 14, to paths are further depicted which represent further activities in the pursuit making database 112 agree with database 1412. In response to report 1410, corrections 1450 may be manually or automatically applied to IXC database 112 to enforce corrected records based on the LEC's responses. Furthermore, where the IXC doubts the information indicated by the LEC, corrections 1452 may be requested of the LEC to bring LEC database 1412 up to date. Either or both of these mechanisms my be used to resolve any discrepancies found between the databases. Of course, report 1410 may be valuable to the IXC in recovering charges for things such as incorrectly rejected service requests.

The foregoing description of an exemplary embodiment of the present invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and a practical application to thereby enable others skilled in the art to best utilize the invention in various embodiments and various modifications as are suited to a particular contemplated use. Although the problem of reconciling data among interexchange carriers and local exchange carriers is a prime example of such need, it should be recognized that similar circumstances may arise anywhere two service providers use separately maintained data to coordinate the allocation of common facilities or leased facilities. This problem may extend to coordination among internet service providers (ISP's), utilities providers, cable television providers, and the like.

It is intended that the appended claims be construed to include other alternative embodiments of the invention except insofar as limited by the prior art.

What is claimed is:

1. A method for automatically reconciling a first database associated with a first service provider with a second database associated with a second service provider, comprising the steps of:

extracting from the first database at least one record pertaining to a service-providing facility;

creating a prevalidation request based upon the record;

automatically submitting the prevalidation request to the second service provider;

obtaining a response to the prevalidation request from the second service provider;

comparing the response from the second service provider to the record extracted from the first database; and outputting a report indicating how the response from the second service provider compares to the record extracted from the first database.

2. The method of claim 1 wherein the prevalidation request is automatically submitted at a prearranged time established by the second service provider.

3. The method of claim 1 further comprising the step of altering the prevalidation request to fulfill requirements specific to the second service provider.

4. The method of claim 1 further comprising the step of updating the record in the first database to be in agreement with the response to the prevalidation request obtained from the second service provider.

5. The method of claim 1 wherein the record comprises information regarding the operational status of the service-providing facility.

6. The method of claim 1 wherein the record comprises information regarding the allocation of the service-providing facility for a particular purpose.

7. The method of claim 1 wherein the record comprises information regarding the type of the service-providing facility.

8. The method of claim 1 wherein the record comprises information regarding the identity of the service-providing facility.

9. The method of claim 1 wherein the record comprises information regarding the location of the service-providing facility.

10. A method for obtaining information about at least one service-providing facility of a service provider comprising the steps of:

creating at least one prevalidation request associated with the service-providing facility;

obtaining from the service provider an acceptable time for submitting of the prevalidation request;

setting a time-detecting process to automatically submit the prevalidation request in compliance with the acceptable time; and receiving the service provider's response to the prevalidation request from which information about the service-providing facility may be obtained.

11. A system for obtaining information about a service-providing facility of a service provider comprising:

a process for generating at least one prevalidation request relating to the service-providing facility;

a process for automatically submitting, in compliance with given time constraints, the prevalidation request to the service provider; and a process for receiving at least one response to the prevalidation request from the service provider, whereby information about the service-providing facility is obtained from the response.

12. A method, to fulfill a request for service from a business customer, for placing a service order with a service provider comprising the steps of:

creating at least one prevalidation request associated with at least one service-providing facility associated with the service provider;

in compliance with a prearranged time schedule, automatically submitting the prevalidation request to the service provider before the request for service is made by the business customer;

receiving a response to the prevalidation request from the service provider; and in response to the request for service from the business customer, submitting the service order to the service provider based upon information provided by the response to the prevalidation request.

* * * * *